G. D. BURNETT.
PEANUT PLOW.
APPLICATION FILED JAN. 4, 1918.
1,285,611.
Patented Nov. 26, 1918.
2 SHEETS—SHEET 1.
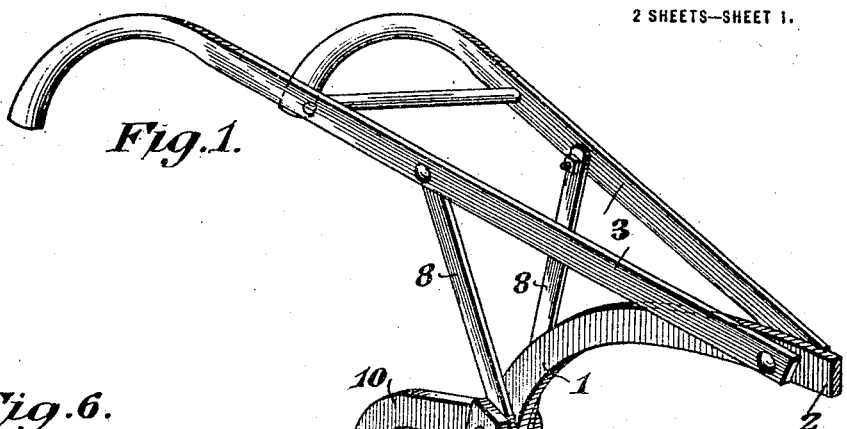
Fig. 1.
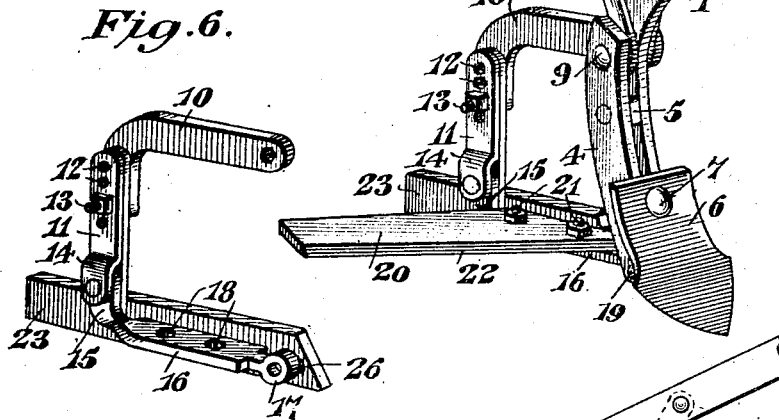
Fig. 6.
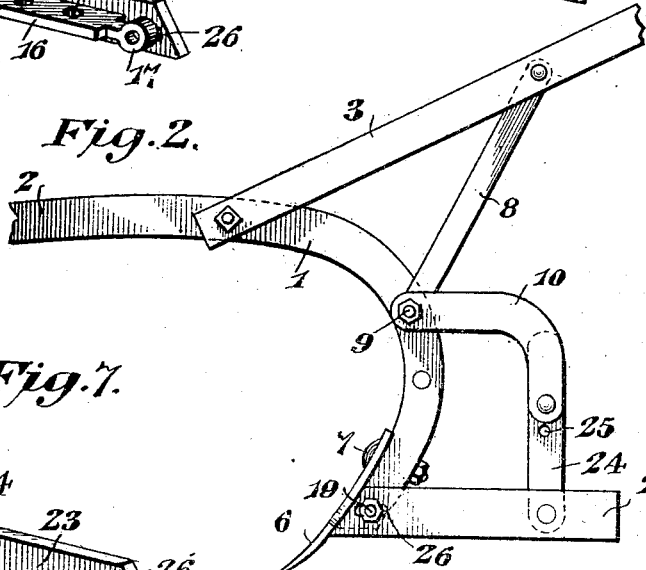
Fig. 2.
Fig. 7.
WITNESSES
Jas. K. McCathran
F. T. Chapman
INVENTOR
Georgia D. Burnett,
BY
E. G. Siggers
ATTORNEY

G. D. BURNETT.
PEANUT PLOW.
APPLICATION FILED JAN. 4, 1918.

1,285,611.

Patented Nov. 26, 1918.
2 SHEETS—SHEET 2.

WITNESSES
Jas. K. McCathran
F. T. Chapman

Georgia D. Burnett, INVENTOR

BY C. G. Siggers
ATTORNEY

UNITED STATES PATENT OFFICE.

GEORGIA D. BURNETT, OF HATCHER STATION, GEORGIA.

PEANUT-PLOW.

1,285,611.  Specification of Letters Patent.  Patented Nov. 26, 1918.

Application filed January 4, 1918. Serial No. 210,373.

*To all whom it may concern:*

Be it known that I, GEORGIA D. BURNETT, a citizen of the United States, residing at Hatcher Station, in the county of Quitman and State of Georgia, have invented a new and useful Peanut-Plow, of which the following is a specification.

This invention has reference to peanut plows, and its object is to provide a plow structure for plowing up or digging peanuts, although the plow may be used for other purposes.

In accordance with the invention, there is provided a plow standard with a shovel plow blade thereon, and an adjustable brace for carrying either a single or a double blade back of the plow shovel, and in the case of the use of a single blade, the brace is provided with a land side.

The plow is designed as a harvesting plow for peanuts and the single or double blade is disposed in a substantially horizontal plane so as to run beneath the surface of the ground and cut the root of the peanut plant slightly below the peanuts, leaving the greater portion of the root of the plant in the ground which portion contains the nodules and fertilizing elements for enriching the ground.

By detaching those parts which constitute the peanut harvesting parts, the plow stock is suitable for attaching any plow or cultivator blade by the ordinary heel bolt.

The invention will be best understood from a consideration of the following detailed description, taken in connection with the accompanying drawings forming part of this specification, with the further understanding that, while the drawings show a practical form of the invention, the latter is not confined to any strict conformity with the showing of the drawings but may be changed and modified so long as such changes and modifications come within the scope of the appended claims.

In the drawings:—

Figure 1 is a perspective view of the plow provided with a single cutter blade;

Fig. 2 is an elevation of a portion of the plow as seen from the side opposite that viewed in Fig. 1;

Fig. 6 is a perspective view of the adjustable brace and land side shown in Fig. 1;

Fig. 7 is a perspective view of the land side and a portion of the adjustable brace fast thereto;

Figure 3:
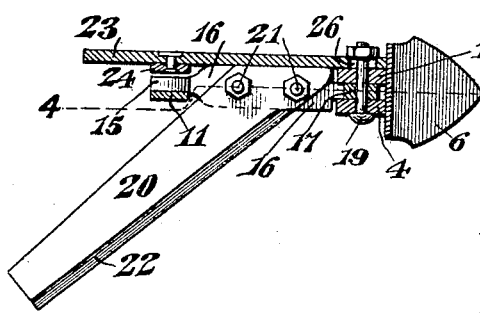
Fig. 3 is a section of the plow taken just above the single cutter blade.
Figure 4:
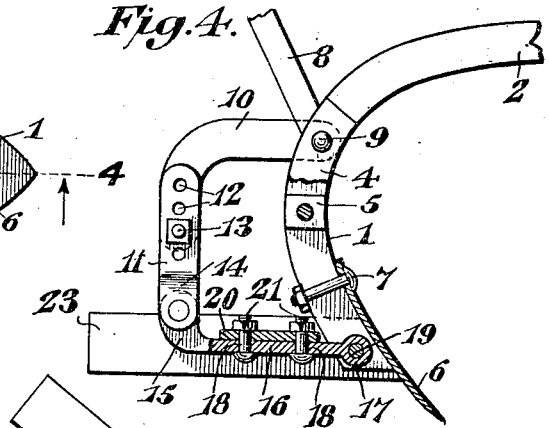
Fig. 4 is a section of the plow on the line 4—4 of Fig. 3.
Figure 5:
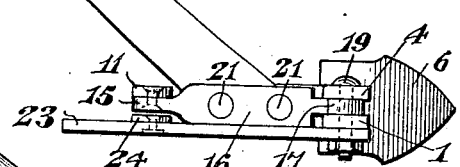
Fig. 5 is a bottom plan view of the plow shown in Fig. 1, but omitting the handles and other distant parts.

Referring to the drawings, there is shown a plow standard 1, plow beam 2, and handles 3, which may correspond to similar parts of ordinary plows. Fast to one side of the standard is a bar 4 spaced from the standard by blocks 5 or otherwise. Fast to the standard and bar is a blade or shovel 6 which may be held by a single bolt 7, although such particular arrangement is not obligatory.

The handles 3 are connected to the standard 1 by brace bars 8 held to the standard by a bolt 9 which may also serve to connect the bar 4 at its upper end to the standard, and furthermore, this bolt 9 is employed as a fastening means for one end of a bent bar 10 constituting one member of an adjustable angular brace. Another member of the brace comprises a strap 11 with a series of perforations 12 therein, any one of which is designed to receive a bolt 13 for securing the angle end of the bar 10 to the strap 11. Ordinarily, the strap 11 is upright, and at its lower end has an offset portion 14 receiving an eye end 15 of a hanger bar 16. The eye end 15 is at an angle to the body of the hanger bar, and the latter is formed at the opposite end with another eye 17, and at intermediate points has perforations 18. The eye 17 extends between the lower end of the plow standard and the bar 4 attached to one side thereof but spaced therefrom, and the eye 17 and the lower end of the plow standard and the bar 4 are traversed by a bolt 19 securing the parts together.

The body of the plow including the standard 1, the bar 4 spaced away from the standard 1 but fast thereto, the adjustable brace bars composed of the bar 10 and strap 11, and the hanger bar 16, are susceptible of use for various purposes, and the parts referred to are particularly useful as parts of a peanut harvesting plow.

In the structure shown in Fig. 1 and associated figures, there is provided a flat blade 20 having one end secured to the hanger bar 16 by bolts 21 traversing the perforations 18. The blade 20 is disposed at an angle to the length of the bar 16 and at an obtuse angle to the shovel so as to offset from the line of travel of the plow blade at a trailing angle. The blade 20 is disposed in a substantially horizontal plane and has a cutting edge 22 to sever the roots of the peanut plants as the blade 6 travels beneath the surface of the ground between two rows of peanut plants. With such an arrangement, the tendency of the blade 20 is to force the plow in a direction away from the blade. To avoid this tendency, there is provided a land side 23 which may be in the form of a plate set on edge and fastened near the rear end to a strap 24 having a longitudinal row of perforations 25 matching the perforations 12 so as to be traversed by the bolt 13. The other or forward end of the land side 23 is tapered to accord with the front face of the plow standard and is formed with an elongated slot 26, and when the land side is in place, this slot is traversed by the bolt 19, thus holding the land side in place but permitting a limited adjustment thereof. With such an arrangement, the plow may be used for severing the tap roots of a single row of peanut plants. The blade 20 is secured to the upper side of the hanger bar 16 with its inner end abutting the landside and arranged so as to not project above or extend below the plane of the landside. In order to adapt the plow for severing the roots of a double row of peanut plants, there is provided a V-shaped blade 27 having its apex portion formed with perforations for the passage of the bolts 21, so that the double blade 27 projects on opposite sides of the line of travel of the plow blade 6. The blade 27 is also disposed in a substantially horizontal plane. In this case, no land side is provided, since it is unnecessary, and consequently both the land side and the strap 24 are omitted.

In order to protect the underface of the hanger 16, especially where the land side is omitted, and consequently the hanger is brought into direct contact with the underlying dirt, a wear plate 28 is secured to the hanger bar 16 by the same bolts 21 which serve to secure the blade 27 thereto.

The two members of the double blade 27 have cutting edges 22ª similar to the cutting edge 22 of the single blade 20.

Figure 8:
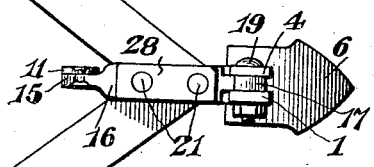
Fig. 8 is a view similar to Fig. 5, but showing the double cutter blade and omitting the land side.
Figure 9:
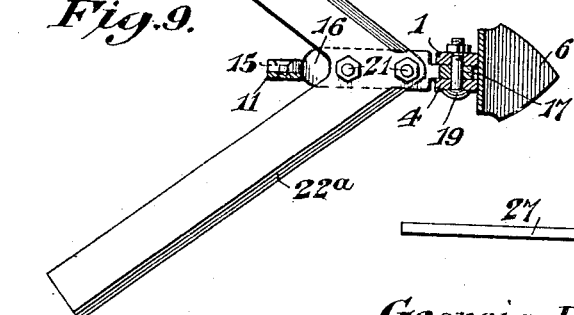
Fig. 9 is a section similar to that of Fig. 3, but showing the double cutter blade.
Figure 10:
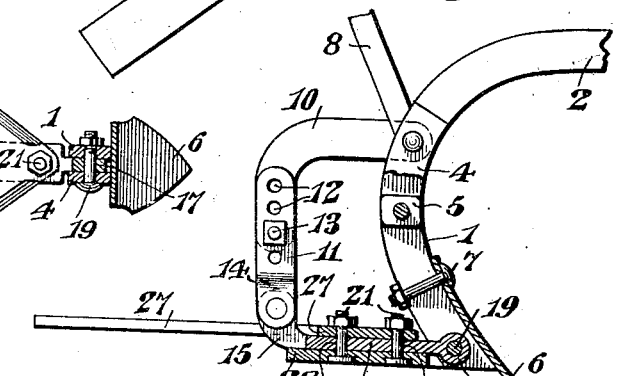
Fig. 10 is a section similar to Fig. 4, but showing the double cutter blade.

The operation of the double blade cutter shown particularly in Figs. 8 to 10 is similar to that of the single blade cutter, but will perform twice the work, although requiring more power for its propulsion.

The blades 27—27 should be run flat at all times and must not be tilted, pitched or have any inclination or curvature. By running the blade in a substantially horizontal plane, it tends to sharpen the same and causes it to wear evenly through the soil as it travels. Shallow surface cutting of the peanut roots, as practised by me with this implement, does not mix the dirt with the peanut vines, whereas if the blade or blades were tilted, pitched or given a curvature, they would certainly carry a forward roll of dirt, more or less, that would mix with the peanuts and peanut vines, necessitating more shaking by hand or causing more dirt to be taken up with the peanuts when harvested.

The hanger bar 16 is not intended to raise the cutting blade or blades, but its purpose is to meet the adjustment of the plow stock, as some land requires the set of the plow more on the point, while with other land it is just the opposite.

What is claimed is:—

1. A peanut harvesting plow provided with a plow blade or shovel, a substantially horizontal flat cutter blade extending diagonally back from the plow blade or shovel at one side and having a straight front cutting edge, and a landside comprising a substantially flat rearwardly extending bar set on edge and traveling in a substantially horizontal plane at one side of the line of travel of the plow shovel and abutting one end of the cutter blade, the latter being adapted to travel in a horizontal plane beneath the surface of the ground, the plane of said blade being below the upper edge of the landside.

2. A plow comprising a standard, a plow shovel carried thereby, a substantially horizontal hanger bar fastened at its front end to the lower end of said standard in rear of the shovel, a brace between the upper end of the standard and the rear end of the hanger bar, a flat cutter blade having its inner end resting upon the hanger bar, means for securing the cutter blade to said hanger bar, said blade having its front edge sharpened and extending outwardly and rearwardly with respect to the plow shovel and in a substantially horizontal plane.

3. A plow comprising a standard, a plow shovel carried thereby, an angular brace connected at its forward end to the upper end of the standard, a substantially horizontal hanger bar connected at its rear end to the lower rear end of the brace and at its forward end to the lower end of the standard, and a flat blade resting upon and secured to the upper face of the hanger bar and extending outwardly and rearwardly from the line of travel of the plow shovel and having its front edge sharpened, said blade traveling in a horizontal plane.

4. A plow comprising a standard, a plow shovel carried thereby, a substantially horizontal hanger bar fastened at its front end to the lower end of said standard in rear of the shovel, a brace between the upper end of the standard and the rear end of the hanger bar, a flat cutter blade having its inner end resting upon the hanger bar, means for securing the cutter blade to said hanger bar, said blade having its front edge sharpened and extending outwardly and rearwardly with respect to the plow shovel and in a substantially horizontal plane, and a landside secured at its front end to the lower end of the standard and near its rear end to the lower end of the brace, said landside being formed of a flat bar set on edge.

5. A peanut harvesting plow comprising a plow standard, a plow blade or shovel carried thereby, a rearwardly extending brace fast to the front end of the plow standard and including an adjustable strap, a hanger bar carried at the rear end by the lower end of the strap and at the front end by the plow standard, and a substantially horizontal cutter blade for peanut roots carried by the hanger and extending outwardly and rearwardly from the line of travel of the plow shovel.

6. A peanut harvesting plow comprising a standard, a plow blade or shovel carried thereby, an adjustable brace extending rearwardly from the standard and having a downwardly extending adjustable strap thereon, a hanger bar connected at the rear end to the strap and at the front end to the plow standard and located behind the plow shovel, a land side connected at the front end to the plow standard and at the rear end hung from the adjustable brace, and a cutter blade for peanut roots connected at one end to the hanger bar and extending rearwardly in a diagonally outward direction from the hanger bar.

In testimony, that I claim the foregoing as my own, I have hereto affixed my signature in the presence of two witnesses.

GEORGIA D. BURNETT.

Witnesses:
  Mrs. M. M. DAVIDSON,
  H. D. ENGRAM.

Copies of this patent may be obtained for five cents each, by addressing the "Commissioner of Patents, Washington, D. C."